US011926951B2

(12) United States Patent
Lee et al.

(10) Patent No.: US 11,926,951 B2
(45) Date of Patent: Mar. 12, 2024

(54) APPARATUS FOR CONTROLLING MOTOR AND METHOD FOR CONTROLLING MOTOR

(71) Applicant: LG ELECTRONICS INC., Seoul (KR)

(72) Inventors: Ki Wook Lee, Seoul (KR); Han Su Jung, Seoul (KR); Kwang Sik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 17/544,238

(22) Filed: Dec. 7, 2021

(65) Prior Publication Data

US 2022/0195655 A1  Jun. 23, 2022

(30) Foreign Application Priority Data

Dec. 18, 2020 (KR) .................. 10-2020-0178339

(51) Int. Cl.
| | |
|---|---|
| *D06F 39/02* | (2006.01) |
| *D06F 34/08* | (2020.01) |
| *D06F 37/30* | (2020.01) |
| *H02P 27/04* | (2016.01) |
| *H02P 27/06* | (2006.01) |
| *D06F 103/46* | (2020.01) |

(52) U.S. Cl.
CPC ............ *D06F 37/304* (2013.01); *D06F 34/08* (2020.02); *H02P 27/045* (2013.01); *H02P 27/06* (2013.01); *D06F 2103/46* (2020.02)

(58) Field of Classification Search
CPC ...................................... D06F 39/028
See application file for complete search history.

(56) References Cited

U.S. PATENT DOCUMENTS

| 9,765,468 B2 | 9/2017 | Kim et al. |
| 2020/0228039 A1 | 7/2020 | Kim et al. |

FOREIGN PATENT DOCUMENTS

| KR | 10-2015-0053559 | 5/2015 |
| KR | 10-2020-0087604 | 7/2020 |

*Primary Examiner* — Jason Y Ko
(74) *Attorney, Agent, or Firm* — KED & ASSOCIATES, LLP

(57) ABSTRACT

Disclosed are a motor control apparatus and a motor control method. Specifically, the motor control apparatus includes an inverter part configured to convert a direct current (DC) input into an alternating current (AC) output and provide the AC output to the motor, and a controller configured to control the inverter part in relation to driving of the motor, and the controller controls the inverter part to apply a first pattern voltage having the same phase to the motor and then apply a second pattern voltage having different phases to the motor.

11 Claims, 15 Drawing Sheets

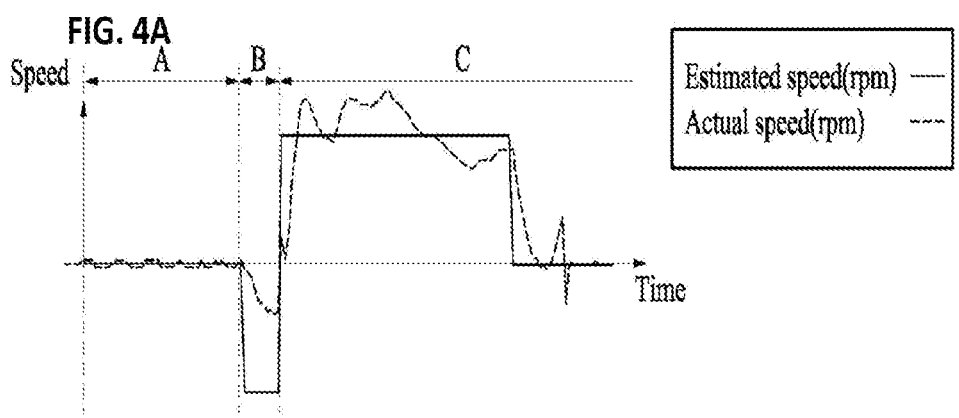
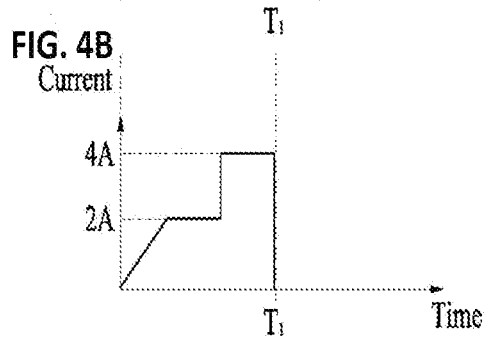

APPARATUS FOR CONTROLLING MOTOR AND METHOD FOR CONTROLLING MOTOR

CROSS-REFERENCE TO RELATED APPLICATION

This application claims the benefit of Korean Patent Application No. 10-2020-0178339, filed in Korea on Dec. 18, 2020, in the Korean Intellectual Property Office, the disclosure of which is incorporated herein in its entirety by reference.

BACKGROUND

Field

The present disclosure relates to relates to a motor control apparatus and a motor control method. One particular implementation relates to a motor control apparatus and method for minimizing rotation of a motor when a stator resistance and a rotor position are controlled while starting the motor.

2. Background

According to an operation principle for motors used in home appliances, current may be controlled only when exact positions of rotors are identified. In order to obtain position information, encoders, resolvers, hall sensors, and the like may be used, but such position detection devices are generally expensive, and have complicating wirings and structures such that usage environment thereof is limited. Accordingly, in recent years, a sensorless control that does not use position detection devices has been actively studied, but the sensorless control has a problem of initial position detection.

Thus, in a related art 1 (Korean Patent Application Publication No. 10-2020-0087604), there is disclosed a configuration for estimating motor resistance by sensorless control by applying 12 signals for 2-point operation.

Further, in a related art 2 (Korean Patent Application Publication No. 10-2015-0053559), there is disclosed a configuration for efficiently detecting a voltage applied to a motor in a sensorless laundry treatment machine.

However, such related arts use a sensorless method, but only disclose a configuration for estimating resistance of a stator at the time of initial start-up and a configuration for detecting a voltage applied to the motor, and disclose technical features that reduce a difference between an estimated position and an actual position by estimating the position of a rotor while inputting different waveforms at the time of initial start-up, but do not disclose a specific method for more accurately measuring the position of the rotor.

As described above, when the position of the motor (rotor) is not accurately estimated, a starting torque may become smaller, and in some cases, a rotation direction of the motor may be reversed, which may cause a danger.

In addition, the related arts use a sensorless method, but do not disclose a technique capable of reducing the rotation of the motor occurring by torque generated due to signals used for estimating the stator resistance and a rotor position at the time of initial start-up.

Accordingly, due to the rotation of the motor, the estimation of the rotor position may be inaccurate so that the motor may not be controlled normally. Thus, user dissatisfaction may occur and the product may be evaluated poorly.

BRIEF DESCRIPTION OF THE DRAWINGS

Arrangements and embodiments may be described in detail with reference to the following drawings in which like reference numerals refer to like elements and wherein:

FIGS. 4A and 4B are diagrams illustrating a current applied to a motor according to an example embodiment;

DETAILED DESCRIPTION

Terms used in example embodiments are general terms that are currently widely used while their respective functions in the present disclosure are taken into consideration. However, the terms may be changed depending on intention of one of ordinary skilled in the art, legal precedents, emergence of new technologies, and the like. Further, in certain cases, there may be terms arbitrarily selected by the applicant, and this case, the meaning of the term will be described in detail in the corresponding description. Accordingly, the terms used herein are not to be construed simply as its designation but based on the meaning of the term and the overall context of the present disclosure.

Throughout the specification, when a part is referred to as including a component, unless particularly defined otherwise, it means that the part does not exclude other components and may further include other components. Further, terms "processer(or)," "processing module," and the like refer to a unit that processes at least one function or operation, which may be implemented in hardware or software or implemented in a combination of hardware and software.

The expression "at least one of a, b, and c," should be understood as including only a, only b, only c, both a and b, both a and c, both b and c, or all of a, b, and c.

A "terminal" referred to below may be implemented as a computer or portable terminal that may access a server or other terminals through a network. In this regard, the computer may include a notebook computer, a desktop computer, a laptop computer, and the like provided with a WEB Browser, and the portable terminal may be a wireless communication device that ensures portability and mobility and may include all types of handheld wireless communication devices, such as an International Mobile Telecommunication (IMT) terminal, a code-division multiple access (CDMA) terminal, a wideband code-division multiple access (W-CDMA) terminal, a long term evolution (LTE) terminal, a smart phone, a table personal computer (PC), and the like.

Example embodiments of the present disclosure that are easily performed by those skilled in the art will be described in detail below with reference to the accompanying drawings. The present disclosure may, however, be implemented in many different forms and should not be construed as being limited to the example embodiments described herein.

Example embodiments of the present disclosure will be described in detail below with reference to the drawings.

Figure 1:
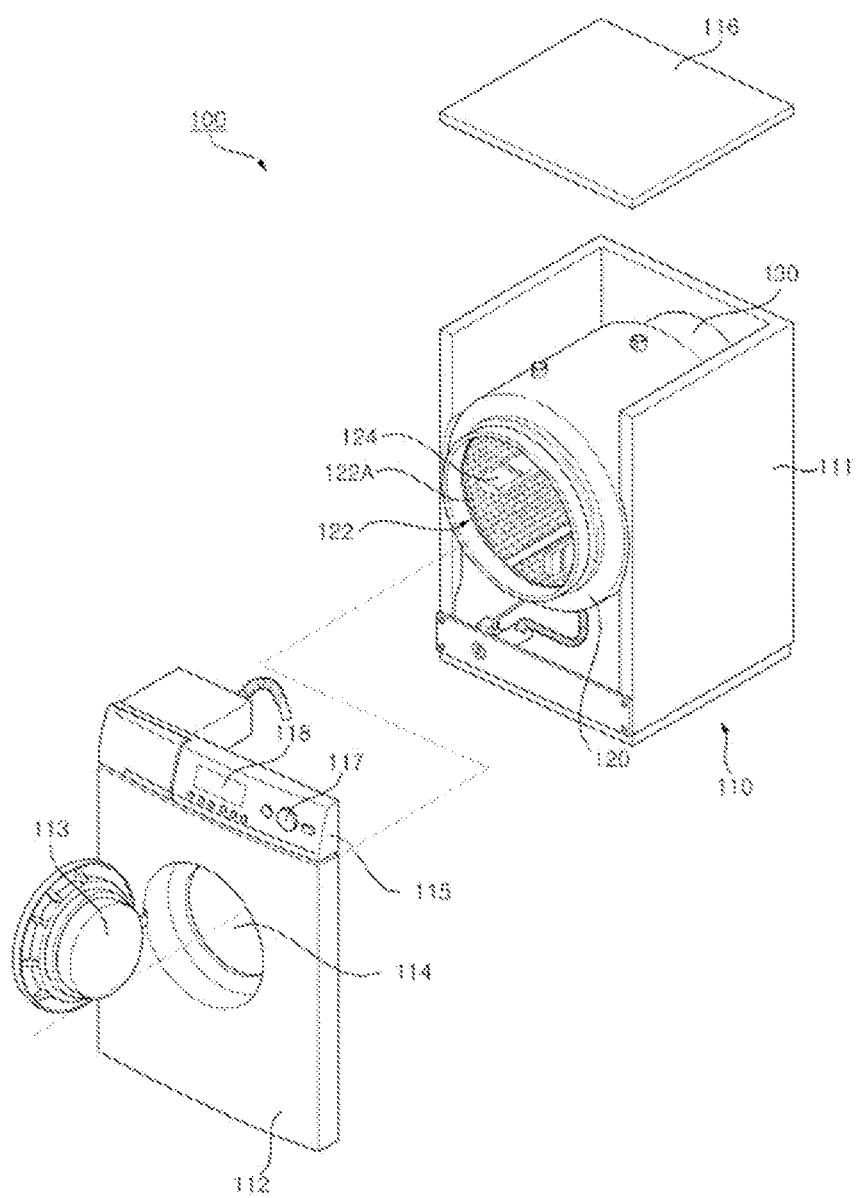
FIG. 1 is a diagram illustrating a clothes treating apparatus according to an example embodiment.

FIG. 1 is a diagram illustrating a clothes treating apparatus according to an example embodiment;

Referring to FIG. 1, a clothes treating apparatus 100 may be a drum type clothes treating apparatus in which cloth is inserted into a washing tub through the front thereof. Alternatively, unlike FIG. 1, the clothes treating apparatus 100 may be a clothes treating apparatus in which the cloth is inserted into the washing tub through an upper portion thereof. The clothes treating apparatus may be an apparatus in which cloth is inserted and at least one of washing, rinsing, dehydrating, and drying is performed on the clothes.

The drum type clothes treating apparatus 100 may include a cabinet 110 forming an exterior thereof, a tub 120 disposed inside the cabinet 110 and supported by the cabinet 110, a drum 122, which is disposed inside the tub 120 and in which cloth is washed, a motor 130 configured to drive the drum 122, a washing water supply device (not shown) disposed outside a cabinet body 111 and configured to supply washing water to the inside of the cabinet 110, and a drainage device (not shown) formed on a lower side of the tub 120 and configured to discharge the washing water to the outside.

The drum 122 may have a plurality of through holes 122A through which washing water passes, and a lifter 124 may be disposed on an inner side surface of the drum 122 such that laundry is lifted to a certain height when the drum 122 rotates and then dropped due to gravity.

The cabinet 110 may include a cabinet body 111, a cabinet cover 112 that is disposed on the front of the cabinet body 111 and combined with the cabinet body 111, a control panel 115 that is disposed on an upper side of the cabinet cover 112 and combined with the cabinet body 111, and a top plate 116 that is disposed on an upper side of the control panel 115 and combined with the cabinet body 111.

The cabinet cover 112 may include a cloth entrance hole 114 through which cloth enters or exits, and a door 113 disposed to be rotatable to the left and right such that the cloth entrance hole 114 may be open and closed.

The control panel 115 may include operation keys 117 for operating operation states of the clothes treating apparatus 100, and a display 118 disposed on one side of the operation keys 117 and configured to display the operation states of the clothes treating apparatus.

The operation keys 117 and the display 118 disposed in the control panel 115 may be electrically connected to a controller (not shown), and the controller (not shown) may electrically control each of constituent elements of the clothes treating apparatus 100. Details of the operation of the controller (not shown) will be described below. Although not shown in the drawing, the clothes treating apparatus 100 may further include various sensors and other devices. For example, the clothes treating apparatus may further include a vibration sensor for measuring the amount of vibration of the drum 122, or may further include a device for detecting and reducing vibration generated according to the amount of eccentricity of cloth accommodated in the drum 122.

Figure 2:
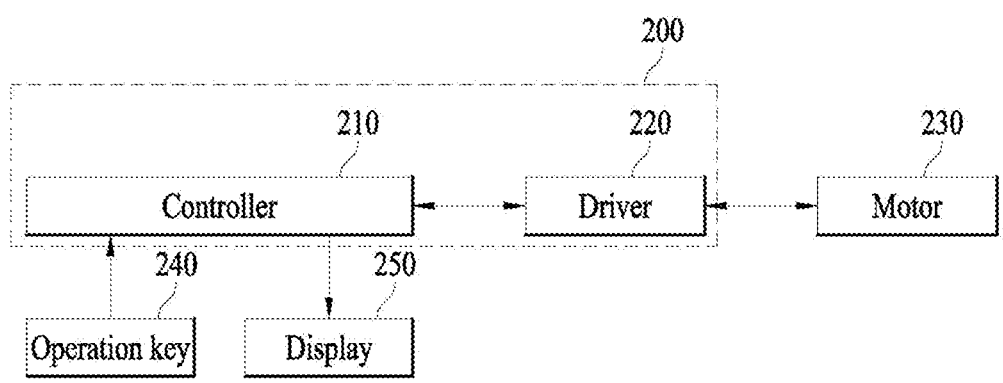
FIG. 2 is a diagram illustrating a configuration of the clothes treating apparatus including a motor control apparatus according to an example embodiment.

FIG. 2 is a diagram illustrating a configuration of a clothes treating apparatus including a motor control apparatus according to an example embodiment.

Referring to FIG. 2, the clothes treating apparatus may include at least one of a motor 230, an operation key 240, a display 250, and a motor control apparatus 200. At this time, the motor control apparatus 200 may include at least one of a controller 210 and a driver 220.

The driver 220 may be controlled by the controller 210, and the motor 230 may be driven by the driver 220. The drum 122 in the tub 120 may rotate according to the driving of the motor 230. The controller 210 may receive an operation signal from the operation key and control operations, for example, may control washing operations such as washing, rinsing, dehydrating, drying, and the like. In addition, the controller 210 may control the display to display operation states associated with washing operations such as a washing course, a washing time, a dehydration time, a rinsing time, and the like.

The driver 220 is provided to drive the motor 230, and may include an inverter (not shown) configured to convert direct current (DC) power into alternating current (AC) power and output the AC power to the motor 230. A sensor for detecting a position of a rotor may not be provided inside or outside the motor 230, and thus the driver 220 may control the motor 230 by a sensorless method.

The motor control apparatus 200 may be an apparatus for controlling the driving of the motor 230 by supplying driving power to the motor 230. In addition, the motor control apparatus 200 may be an apparatus for controlling the operation of the motor 230 to control the driving of a compressor including the motor 230. The motor 230 controlled by the motor control apparatus 200 may include a three-phase motor having a stator and a rotor, and AC power of a predetermined frequency is applied to a coil of the stator of each phase of three phases so that the rotor rotates. For example, the motor may include a surface-mounted permanent magnet synchronous motor (SMPMSM), an interior permanent magnet synchronous motor (IPMSM), and a synchronous reluctance motor (Synrm).

The controller 210 may control the driver 220 such that, before starting the motor 230, a first pattern voltage for estimating resistance of the stator of the motor 230 is applied before a second pattern voltage for estimating the position of the rotor of the motor 230 is applied. In the present specification, the first pattern voltage may correspond to a first pattern signal, and the second pattern voltage may correspond to a second pattern signal.

The controller 210 may control the driving of the motor 230 on the basis of the position of the rotor, which is estimated according to the result of applying the first pattern voltage, and the resistance of the stator estimated according to the result of applying the second pattern voltage.

In the present specification, the first pattern signal may include a first sub-pattern signal set including a plurality of signals having the same phase and different magnitudes. For example, the first sub-pattern signal set may include a first input signal and a second input signal having the same phase but different magnitudes. In addition, the second pattern signal may include a second sub-pattern signal set including a plurality of signals having the same magnitude and different phases. For example, the second sub-pattern signal set may include a first sub-pattern signal, a second sub-pattern signal, a third sub-pattern signal, a fourth sub-pattern signal, a fifth sub-pattern signal, and a sixth sub-pattern signal having the same magnitude but different phases.

Further, in the present specification, a first input voltage may correspond to the first input signal, and a second input voltage may correspond to the second input signal. In addition, in the present specification, the first sub-pattern signal may correspond to a first sub-pattern voltage, the second sub-pattern signal may correspond to a second sub-pattern voltage, the third sub-pattern signal may correspond to a third sub-pattern voltage, the fourth sub-pattern signal may correspond to a fourth sub-pattern voltage, the fifth sub-pattern signal may correspond to a fifth sub-pattern voltage, and the sixth sub-pattern signal may correspond to a sixth sub-pattern voltage.

The first pattern voltage may correspond to signals having different magnitudes and the same phase, and the second pattern voltage may correspond to signals having the same magnitude and different phases. Specifically, the first pattern voltage may include the first input voltage and the second input voltage having the same phase. However, a maximum value of the first input voltage and a maximum value of the second input voltage may be different, and angles of composite magnetic fluxes of the motor generated due to the first input voltage and the second input voltage may be the same. Meanwhile, the first input voltage and the second input voltage may each have a sine wave form.

Further, the controller 210 may control the driver 220 to apply the second input voltage when a time longer than a first threshold time has passed from a point at which a response current for the first input voltage is 0 ampere (A).

Meanwhile, a resistance value of the stator may be estimated in a section in which the response current for each of the first input voltage and the second input voltage is less than 0 A.

Further, the controller 210 may control the driver 220 not to apply the first pattern voltage before a time longer than the second threshold time has passed after receiving a stop command from the motor 230. The resistance value of the stator may be newly estimated when the time longer than the second threshold time has passed after receiving the stop command of the motor 230.

Further, the resistance value of the stator may not be updated even when the first pattern voltage is applied before the time longer than the second threshold time has passed after receiving the stop command of the motor 230.

Meanwhile, the first pattern voltage may be a voltage in which a compensation voltage is added to the command voltage in order to correct an error between the command voltage and a voltage output to the motor 230. At this time, when the driver 220 includes a plurality of inverters, the compensation voltage may be changed according to a sum of voltage errors occurring when power is applied to the plurality of inverters.

According to an example embodiment, when the motor 230 starts operating, the motor control apparatus 200 may estimate the position of the rotor after estimating the resistance of the stator without aligning the position of the rotor of the motor 230. As such, since the position of the rotor is not aligned before the motor 230 starts operating, a time taken to align the position of the rotor may be reduced. In addition, a signal for estimating the resistance of the stator and a signal for estimating the position of the rotor are separated, and the signal for estimating the resistance is applied prior to the signal for estimating the position, so that the accuracy of the resistance estimation may be improved. That is, since the resistance of the stator is estimated before estimating the position of the rotor, an influence due to the signal for estimating the position may be minimized.

Figure 3:
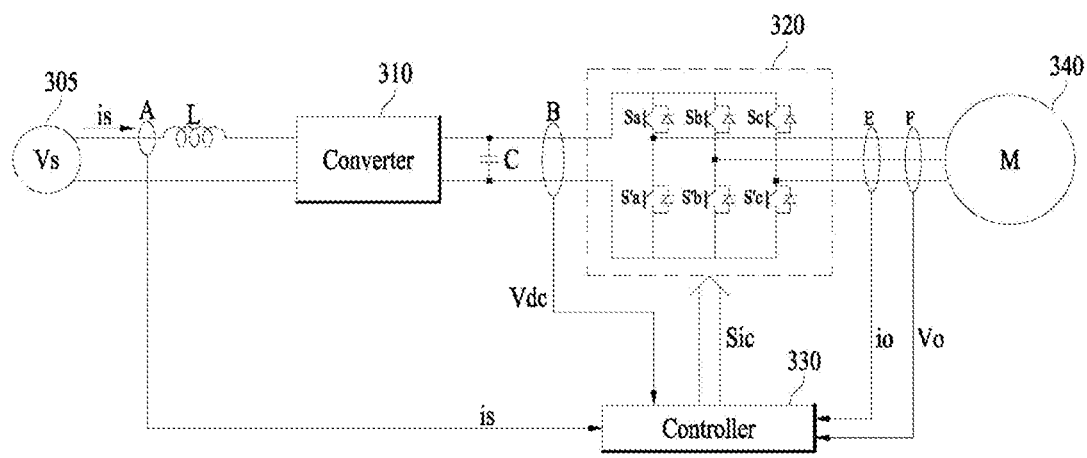
FIG. 3 is a diagram illustrating a clothes treating apparatus according to an example embodiment.

FIG. 3 is a diagram illustrating a clothes treating apparatus according to an example embodiment.

Referring to FIG. 3, the clothes treating apparatus may include at least one of an AC power 305, a reactor L, a converter 310, a smoothing capacitor C, an inverter 320, a controller 330, and a motor 340. In addition, the clothes treating apparatus may include an input current detector A, a dc stage voltage detector B, an output current detector E, and an output voltage detector F.

Here, the reactor L may be disposed between an AC power 305 $V_s$ and the converter 310, and may perform power factor correction or a step-up operation. In addition, the reactor L may also perform a function of limiting a harmonic current caused by high-speed switching of the converter 310.

The input current detector A may detect an input current is input from the AC power 305. To this end, a current transformer (CT), a shunt resistor, or the like may be used as the input current detector A. The detected input current may be input to the controller 330 as a pulse-type discrete signal.

The converter 310 may convert the AC power 305 through the reactor L into DC power and output the DC power. At this time, the AC power 305 may be a single-phase AC power or a three-phase AC power, and an internal structure of the converter 310 may be changed according to the type of the AC power 305. The converter 310 may include a diode or the like without including a switching element, and may perform a rectification operation without a separate switching operation. For example, four diodes of a bridge form may be used as the converter 310 in the case of single-phase AC power, and six diodes of a bridge form may be used as the converter 310 in the case of three-phase AC power. When the converter 310 includes a switching element, a step-up operation, a power factor improvement, and a DC power conversion may be performed by a switching operation of the switching element of the converter 310.

The smoothing capacitor C may smooth and store the input power. In FIG. 3, the smoothing capacitor C is illustrated as being one element, but a plurality of the elements may be used to secure device stability. In addition, in FIG. 3, the smoothing capacitor C is illustrated as being positioned at an output terminal of the converter 310, but is not limited thereto, and DC power may be directly input to the smoothing capacitor C. The DC power is stored in the smoothing capacitor C, and thus both ends of the smoothing capacitor C may be referred to as a dc stage or a dc link stage.

The dc stage voltage detector B may detect a dc stage voltage Vdc at both ends of the smoothing capacitor C. The dc stage voltage detector B may include a resistance element, an amplifier, and the like. The detected dc stage voltage Vdc may be input to the controller 330 as a pulse-type discrete signal.

The inverter 320 includes a plurality of switching elements, and may convert the DC power Vdc, which is smoothed by on/off operation of the switching elements, into three-phase AC power $v_a$, $v_b$, and $v_c$ of a predetermined frequency and output the three-phase AC power $v_a$, $v_b$, and $v_c$ to the motor 340. When each of upper-arm switching elements $S_a$, $S_b$, and $S_c$ being connected in series and each of lower-arm switching elements $S'_a$, $S'_b$, and $S'_c$ being connected in series form a pair, the inverter 320 may have a structure having a total of three pairs of upper and lower arm switching elements connected in parallel. Each of the switching elements $S_a$, $S'_a$, $S_b$, $S'_b$, $S_c$, and $S'_c$ may have a structure in which a diode is connected in parallel.

The switching elements in the inverter 320 may be controlled to be an on/off state on the basis of a control signal $S_{ic}$ from the controller 330. Accordingly, AC power having a predetermined frequency may be output to the motor 340. The control signal $S_{ic}$ is a switching control signal of a pulse width modulation (PWM) method, and may be generated and output based on an output current $i_o$ detected by the output current detector E and an output voltage $V_o$ detected by the output voltage detector F.

The controller 330 may control the switching operation of the inverter 320 on the basis of a sensorless method. To this end, the controller 330 may receive the output current $i_o$ detected by the output current detector E and the output voltage $V_o$ detected by the output voltage detector F.

The output current detector E may detect the output current $i_o$ flowing between the inverter 320 and the motor 340. That is, current flowing through the motor 340 may be detected. In addition, the output current detector E may detect all of output currents ia, ib, and ic of respective phases, or may detect output currents of two phases using a three-phase balance. The output current detector E may be positioned between the inverter 320 and the motor 340, and a current transformer (CT), a shunt resistor, or the like may be used to detect current. When a shunt resistor is used as the output current detector E, three shunt resistors may be positioned between inverter 320 and the motor 340, may be connected respectively, at one terminal thereof, to three lower arm switching elements $S'_a$, $S'_b$, and $S'_c$ of the inverter 320. In addition, two shunt resistors may also be used using a three-phase balance. In addition, when a single shunt resistor is used, the shunt resistor may be used between the capacitor C and the inverter 320. The detected output current $i_o$ may be applied to the controller 330 as a pulse-type discrete signal, and the control signal $S_{ic}$ may be generated on the basis of the detected output current $i_o$.

The output voltage detector F is positioned between the inverter 320 and the motor 340, and may detect an output voltage that is applied to the motor 340 from the inverter 320. When the inverter 320 is controlled by a PWM-based switching control signal, the output voltage may be PWM-based pulse type voltage. The output voltage detector F may include a resistance element electrically connected between the inverter 320 and the motor 340, and a comparator connected to one end of the resistance element. The detected output voltage $V_o$ may be applied to the controller 330 as a pulse-type discrete signal, and the control signal $S_{ic}$ may be generated on the basis of the detected output voltage $V_o$.

FIGS. 4A and 4B are diagrams illustrating a current applied to a motor according to an example embodiment.

In the related art sensorless control of a motor of a washing machine, an initial position alignment may be carried out to stabilize initial starting characteristics and detection performance. In the initial position alignment operation, as shown in FIG. 4, a DC current is applied to align a position of the motor to a specific position, and then the motor is driven, and by using voltage and current information at this time, a stator resistance Rs, which is an essential parameter for sensorless control, is detected. As such, a predetermined signal as shown in FIG. 4B may be applied to align the position of the motor to a specific position, and then the motor may be driven.

Referring to FIGS. 4A and 4B, section A is a section in which the position alignment of the rotor is carried out, and section B may be a section in which a swing start of the motor is carried out. In addition, the starting of the motor may begin from section C. Referring to FIG. 4A, it can be seen that, in section A, a motor speed is close to zero because it is before starting the motor, but when it reaches section C after passing section B, the motor speed increases.

Meanwhile, a predetermined signal applied to the motor control apparatus in section A may be the same as that shown in FIG. 4B. When the motor control apparatus is controlled in the form in FIG. 4, the motor control apparatus may simultaneously estimate the resistance of the stator while aligning the position of the rotor. However, there is a problem in that a time (0 to $T_1$) taken to align the position is relatively longer than a time taken to estimate the resistance of the stator and the position of the rotor without aligning (alignless) the position as in FIG. 5, and the greater the inertia of an object to be driven by the motor, the longer the time taken to align the position.

Figure 5A:
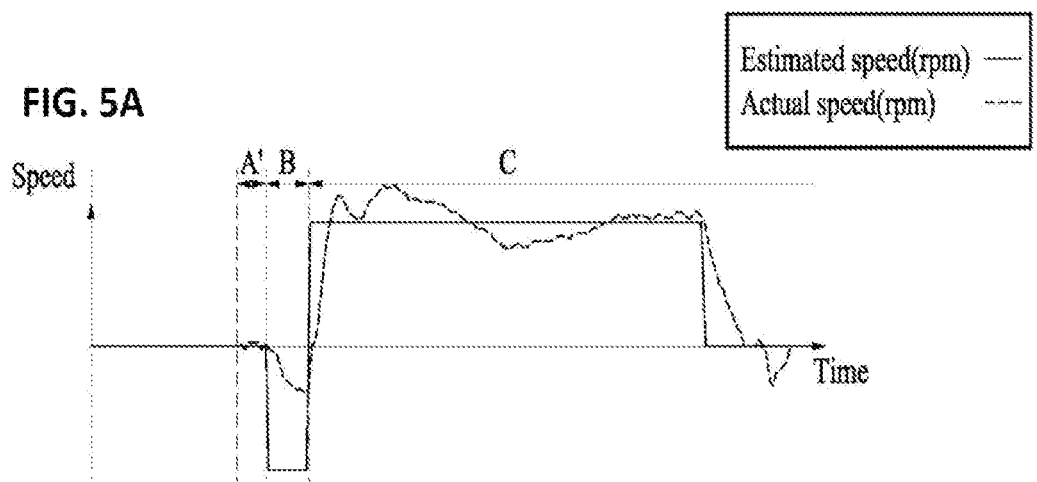
FIGS. 5A and 5B are diagrams illustrating a current applied to a motor according to another example embodiment.
Figure 5B:
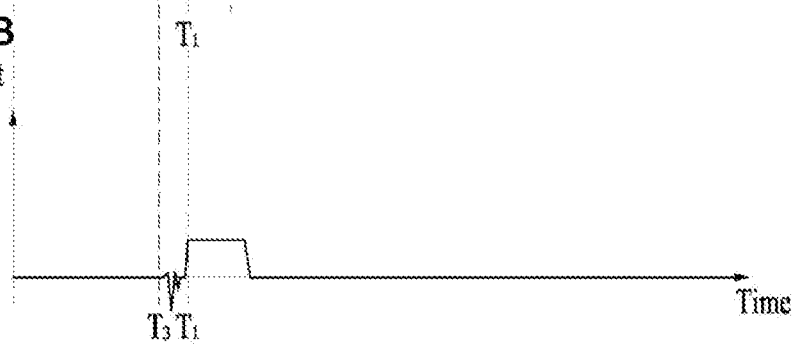

FIGS. 5A and 5B are diagrams illustrating a current applied to a motor according to another example embodiment.

In a motor control apparatus and method according to an example embodiment, instead of performing a process of aligning a position of a rotor, a first pattern voltage is applied to estimate resistance of a stator, and a second pattern voltage is applied to estimate the position of the rotor. Thus, the motor control apparatus may estimate the resistance of the stator and the position of the rotor in section A' (alignless) shown in FIG. 5A instead of section A (align) shown in FIG. 4A. Details about the first pattern voltage and the second pattern voltage will be described with reference to FIGS. 6 to 14 below.

At this time, current applied to the motor control apparatus from section A' (alignless) to section C may be the same as that shown in FIG. 5B. Referring to FIGS. 4 and 5, it can be seen that a time (section A') taken to estimate the resistance of the stator and the position of the rotor is relatively shorter than a time (section A) taken to align the position of the rotor. For example, when the current according to FIG. 4 is applied, the required time (section A (align)) taken for the application is approximately 3 sec., but, when the current according to FIG. 5 is applied, the required time (section A' (alignless)) taken for the application may be approximately 0.31 sec. Accordingly, the motor control apparatus and method may reduce noise and/or vibration of the motor.

In relation to section A' (alignless), a detailed description of estimating the resistance of the stator and the position of the rotor by applying the first pattern voltage and the second pattern voltage without aligning the position will be made with reference to the drawings.

Figure 6:
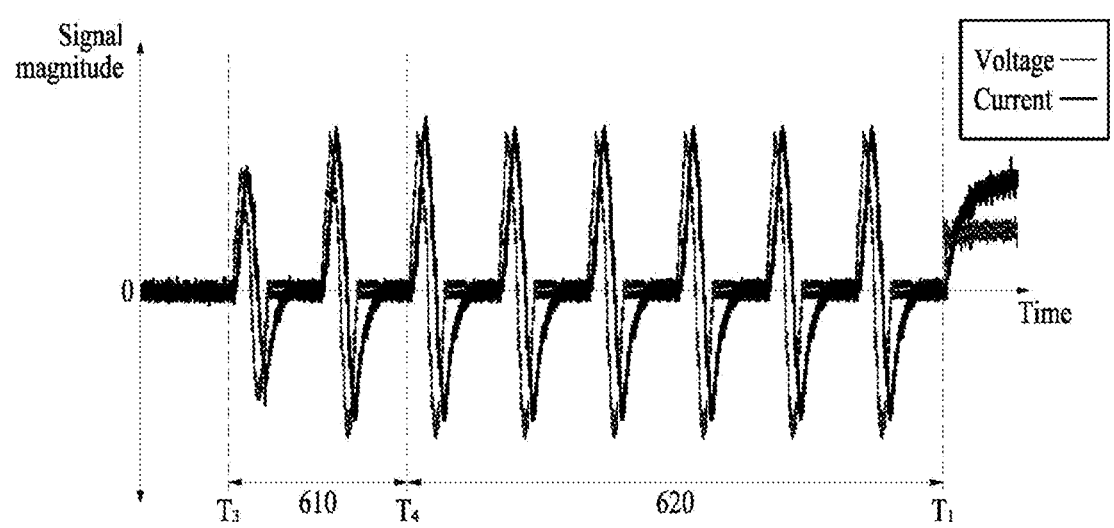
FIG. 6 is a diagram illustrating a resistance estimation section and an initial position estimation section according to an example embodiment.

FIG. 6 is a diagram illustrating a resistance estimation section and an initial position estimation section according to an example embodiment.

Referring to FIG. 6, in a motor control apparatus and method according to an example embodiment, an inverter may be controlled such that a first pattern voltage 610 for estimating resistance and a second pattern voltage 620 for estimating an initial position are applied in response to a start of the driving of the motor.

Meanwhile, when a signal for estimating the resistance and a signal for estimating the initial position are applied, rotational torque is generated by the signals so that the motor may be moved. This movement of the motor may affect the performance of estimating the resistance.

When this is taken into consideration, the first pattern voltage 610 may be applied before the second pattern voltage 620 is applied. Accordingly, the motor control apparatus and method according to an example embodiment may prevent the performance of estimating the resistance from being degraded due to the second pattern voltage 620.

Further, in order to offset a voltage error due to non-linearity of the inverter, the first pattern voltage 610 may be applied to the same position of the rotor. Whether the first pattern voltage is applied to the same position of the rotor is detected by detecting an angle of a composite magnetic flux of the motor due to the first pattern voltage. For example, the first pattern voltage 610 may be applied at 0 degrees)(°, but the position at which the first pattern voltage 610 is applied is not limited thereto.

Figure 7:
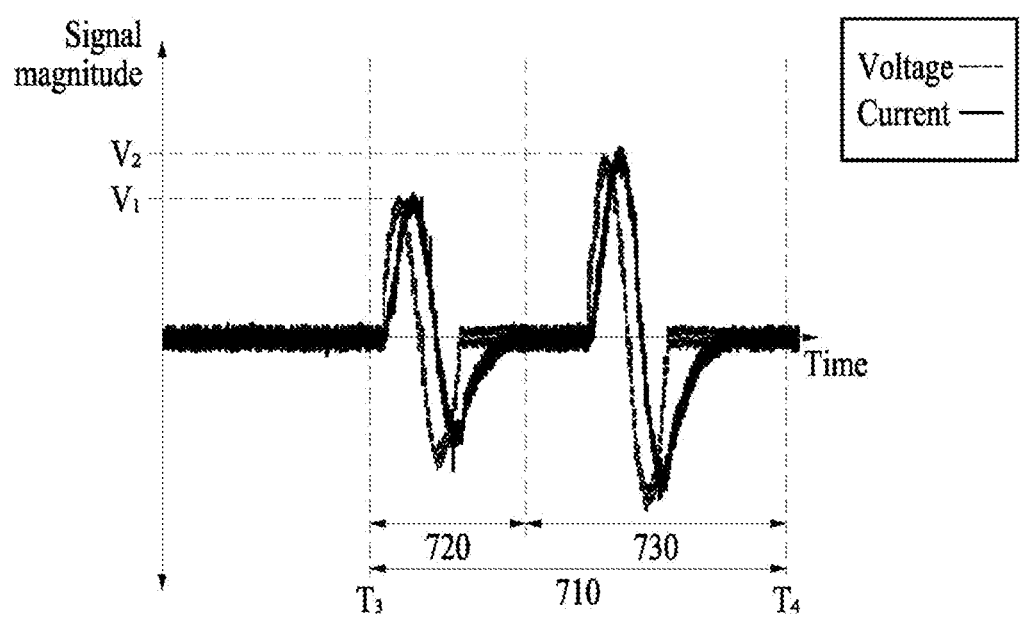
FIG. 7 is a diagram illustrating an example of the resistance estimation section according to an example embodiment.

FIG. 7 is a diagram illustrating an example of the resistance estimation section according to an example embodiment.

Referring to FIG. 7, a first pattern voltage 710 for estimating resistance may include a first input voltage 720 having a maximum value of V1 and a second input voltage 730 having a maximum value of V2. For example, V1 may be 0.75*V2, but the relationship between V1 and V2 is not limited thereto. In other words, the first pattern voltage 710 may include the first input voltage 720 and the second input voltage 730 having different amplitudes. However, the shape of the first pattern voltage 710 is not limited thereto, and the first pattern voltage 710 may be at least one of a square wave, a half wave, a pulse, and a sine wave.

Figure 8:
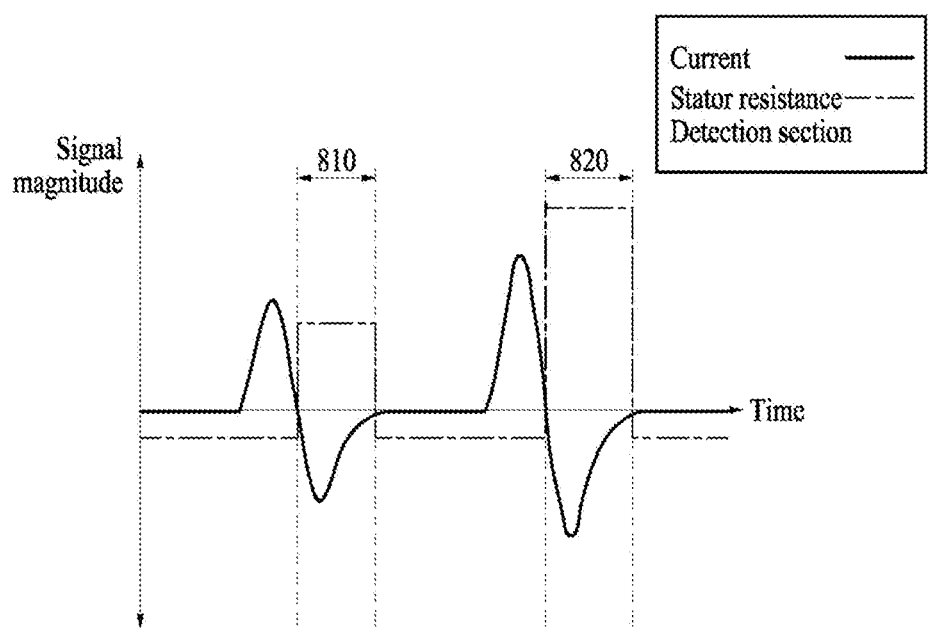
FIG. 8 is a diagram illustrating an example of a resistance detection section included in the resistance estimation section according to an example embodiment.

FIG. 8 is a diagram illustrating an example of a resistance detection section included in the resistance estimation section according to an example embodiment.

When the first pattern voltage includes a first input voltage and a second input voltage, a first detection section 810 of FIG. 8 indicates a section in which a response current for the first input voltage is less than 0 A. In addition, a second detection section 820 indicates a section in which a response current for the second input voltage is less than 0 A. The motor control apparatus and method according to an example embodiment may estimate the resistance of the stator on the basis of information checked in the first detection section 810 and the second detection section 820.

Meanwhile, a stator resistance Rs may be calculated on the basis of Equations 1 to 4 below. First, a motor voltage equation based on a stationary coordinate system is given by Equation 1.

$$V_\alpha = R_s I_\alpha + L_s \frac{dI_\alpha}{dt} - \omega_{re} \phi_f \sin\theta_{re} \qquad \text{[Equation 1]}$$

where, $L_S$ denotes a stator inductance. Meanwhile, assuming that $\omega_{re}=0$, integral values for voltages detected in the first detection section 810 and the second detection section 820 may be respectively expressed as Equations 2 and 3.

$$\int V_{\alpha 1} dt = R_s \int I_{\alpha 1} dt + L_s \int \frac{dI_{\alpha 1}}{dt} dt \qquad \text{[Equation 2]}$$

where, $V_{\alpha 1}$ denotes a voltage detected in the first detection section 810, and $I_{\alpha 1}$ denotes a current detected in the first detection section 810.

$$\int V_{\alpha 2} dt = R_s \int I_{\alpha 2} dt + L_s \int \frac{dI_{\alpha 2}}{dt} dt \qquad \text{[Equation 3]}$$

where, $V_{\alpha 2}$ denotes a voltage detected in the second detection section 820, and $I_{\alpha 2}$ denotes a current detected in the second detection section 820. Accordingly, using Equations 2 and 3, the stator resistance Rs may be calculated as Equation 4.

$$R_s = \frac{\left(\left(\int V_{\alpha 2} - \int V_{\alpha 1}\right) - L_s(I_{\alpha 2} - I_{\alpha 1})\right)}{\left(\int I_{\alpha 2} - \int I_{\alpha 1}\right)} \qquad \text{[Equation 4]}$$

Figure 9:
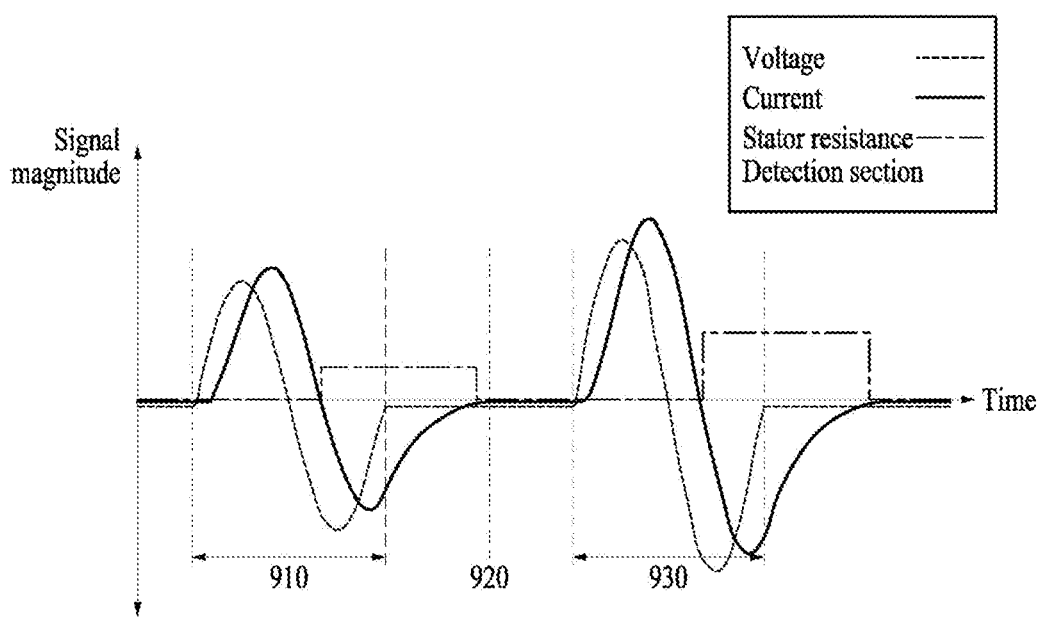
FIG. 9 is a diagram for describing a method of estimating a stator resistance according to an example embodiment.

FIG. 9 is a diagram for describing a method of estimating a stator resistance according to an example embodiment.

Referring to FIG. 9, the motor control apparatus and method according to an example embodiment may control a switching operation such that a second input voltage is applied when a time longer than a first threshold time has passed from a point at which a response current for a first input voltage is 0 A after the first input voltage has applied.

Referring to FIG. 9, when a first input voltage 910 is applied, a response current for the first input voltage 910 may be detected. In the motor control apparatus and method according to an example embodiment, a second input voltage 930 may be applied when a time longer than the first threshold time has passed from a point 920 at which the response current for the first input voltage 910 is 0 A. For example, the first threshold time may be 15 ms, but the first threshold time is not limited thereto.

When the motor moves while the resistance is estimated, a voltage due to a counter electromotive force may be generated so that a resistance estimation error may occur. Thus, when starting the motor in a state in which the motor is not completely stopped, a signal for estimating resistance may not be applied, or a resistance value may not be newly detected even when the signal for estimating the resistance is applied. Here, the expression "the resistance value is not newly detected" may include that a previously estimated resistance value is not updated by a new resistance value even when the resistance value is newly estimated. For example, although it depends on a load amount and quantity, when a time period from a motor stop command to a motor start command is within 3.5 seconds, the resistance value may not be updated. In addition, the resistance value of the stator may not be detected or updated in a motion in which the motor starts immediately after stopping, such as a short circuit after detecting eccentricity, or cloth wetting pattern, in addition to a motion that controls the operation of the motor with a net acting ratio, such as washing or tumbling.

Accordingly, the motor control apparatus and method according to an example embodiment may reduce a resistance error.

Figure 10A:
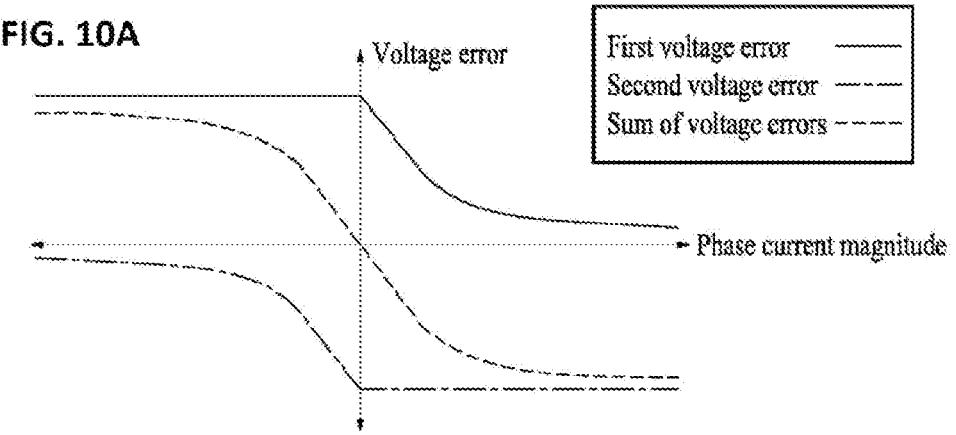
FIGS. 10A and 10B are diagrams for describing non-linear characteristics of an inverter and a compensation voltage according to the non-linear characteristics of the inverter according to an example embodiment.
Figure 10B:
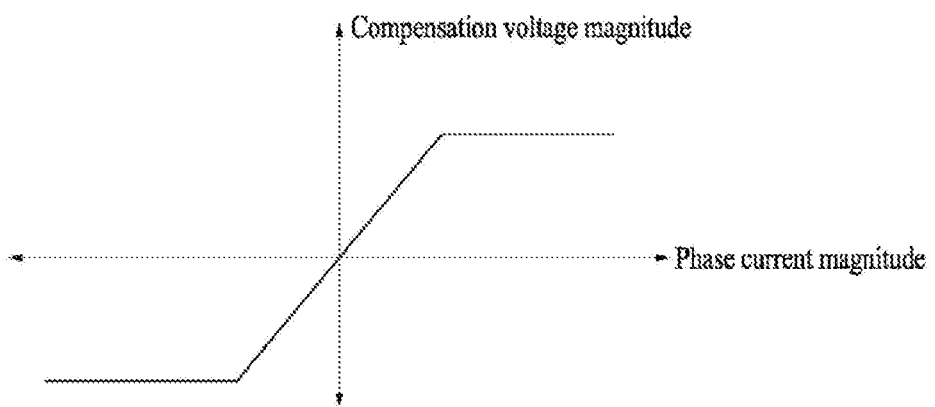

FIGS. 10A and 10B are diagrams for describing non-linear characteristics of the inverter and a compensation voltage according to the non-linear characteristics of the inverter according to an example embodiment.

Referring to 10A and 10B, in the motor control apparatus and method according to an example embodiment, a first pattern voltage acquired by adding a compensation voltage to a command voltage may be applied to compensate for non-linearity of the inverter.

When a voltage for estimating resistance is applied, non-linear characteristics of the inverter due to dead time or the like in a low voltage region may be present. Accordingly, in order to reduce an influence of the non-linear characteristics of the inverter, a voltage error occurring at the dead time may be calculated and may be added to the command voltage. As such, the voltage added to the command voltage may be defined as a compensation voltage.

Referring to FIG. 10A, a first voltage error represents a voltage error when power is applied to a lower inverter of the motor, and a second voltage error represents a voltage error when power is applied to an upper inverter of the motor. It can be seen that the voltage error occurs in a section except for a point at which the magnitude of a phase current is 0 A when the first voltage error and the second voltage error are summed.

FIG. 10B illustrates a compensation voltage determined in consideration of the sum of the voltage errors shown in FIG. 10A. Referring to FIGS. 10A and 10B, it can be seen that the compensation voltage has a sign opposite to that of the voltage error.

Figure 11A:
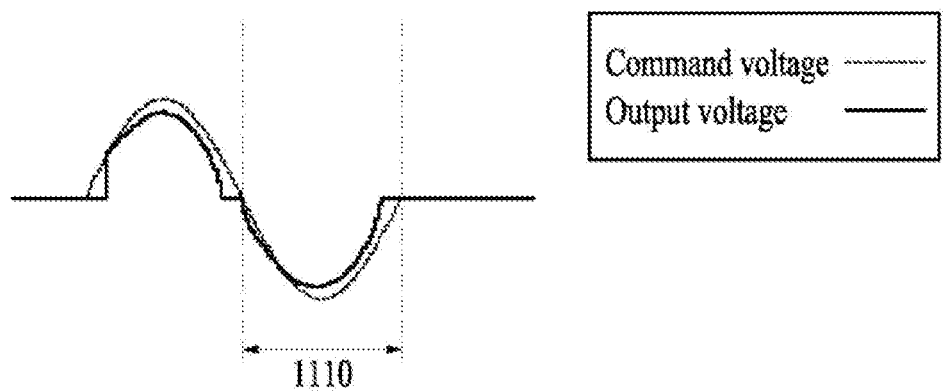
FIGS. 11A and 11B are diagrams for describing a difference between a command voltage according to the compensation voltage and a voltage output to the motor, according to an example embodiment.
Figure 11B:
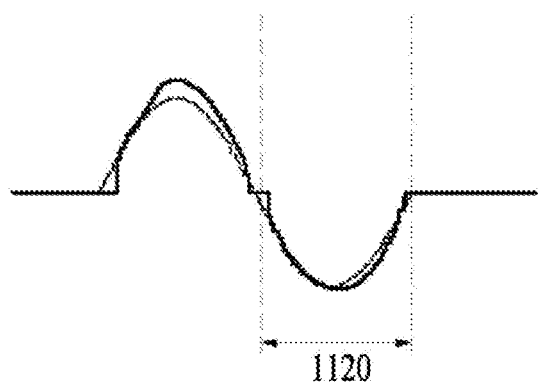

FIGS. 11A and 11B are diagrams for describing a difference between a command voltage according to the compensation voltage and a voltage output to the motor, according to an example embodiment.

Referring to FIGS. 11A and 11B, the motor control apparatus and method according to an example embodiment may estimate the resistance of the stator in a detection section in which the response current for the first pattern voltage is less than 0 [A]. Meanwhile, the first detection section is highly likely to be similar to a first section 1110 of FIGS. 11A and 11B, and thus in the description of FIGS. 11A and 11B, it is assumed that the motor control apparatus and method estimate the resistance of the stator in the first section 1110.

Meanwhile, FIG. 11A is a diagram illustrating the command voltage and an output voltage, which is a voltage output to the motor before the non-linearity of the inverter is compensated for. It can be seen that a difference occurs between the command voltage and the output voltage in the first section 1110 because the compensation voltage is not considered.

Meanwhile, after the compensation voltage is added to the command voltage to compensate for the non-linearity of the inverter, the output voltage may be the same as that in FIG. 11B. Referring to FIG. 11B, it can be seen that the command voltage and the output voltage are substantially similar to each other in the first section 1120.

Figure 12:
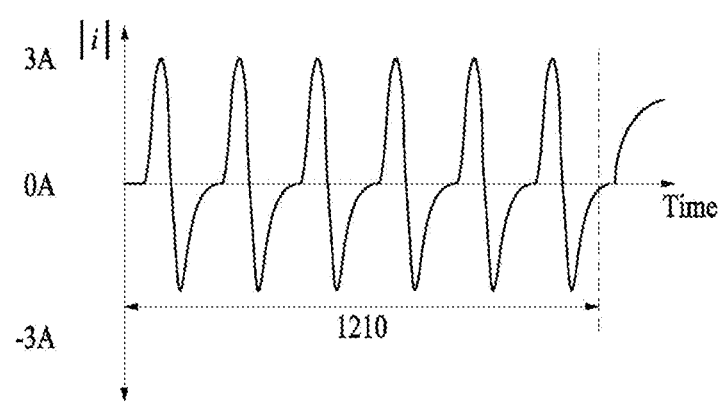
FIG. 12 is a diagram illustrating a response current according to an example embodiment.

FIG. 12 is a diagram illustrating a response current according to an example embodiment.

Referring to FIG. 12, the controller may control the inverter such that an input voltage of a specific pattern is applied to the motor. Here, the input voltage of the specific pattern may include one of a square wave, a half wave, a pulse, and a sine wave. Here, the input voltage of the specific pattern may include the first pattern voltage and the second pattern voltage. As described above, the resistance of the stator may be estimated using the first pattern voltage, and the position of the rotor may be estimated using the second pattern voltage.

The second pattern voltage may include a plurality of signals of different phases applied to the motor. That is, the plurality of signals may be signals that are applied to different positions of the motor. Meanwhile, the first pattern voltage may include signals of the same phase applied to the motor, which may be the signals applied to the same position of the motor. Since the plurality of signals are applied to different positions of the motor, an angle of a composite magnetic flux of the motor may be sequentially changed. FIG. 12 is a diagram made on the assumption that the second pattern voltage has a sine wave shape. When the second pattern voltage has a sine wave shape, torque is generated in a positive direction and a negative direction, so that an average torque of one cycle may become zero. Accordingly, torque ripple may be reduced.

The second pattern voltage may include a plurality of sub-pattern voltages, and each of the sub-pattern voltages may be applied after a response current corresponding to a previously applied sub-pattern voltage becomes zero. In a section 1210 in which the second pattern voltage is applied, a sine wave of one cycle may be applied, for example, six times, and accordingly, the response current may also have a shape similar to the sine wave. For example, when the second pattern voltage includes first to sixth sub-pattern voltages, which are sine waves, a response current may also have a shape similar to a sine wave, and first to sixth response currents respectively for the first to sixth sub-pattern voltages may be generated.

Each of the sine waves may be a sine wave applied after a third threshold time has passed after the response current due to the previously applied sub-pattern voltage becomes zero. That is, since the second pattern voltage is not a continuous sine wave, the response current may also have a shape different from that of the continuous sine wave.

Meanwhile, the applied sub-pattern voltage may have a low noise frequency and magnitude. For example, the second pattern voltage may be applied such that a response current of 3 A or less and 50 hertz (Hz) is generated. However, the magnitude and frequency of the second pattern voltage that may be applied are not limited thereto, and it is obvious to those skilled in the art that the magnitude and frequency of the second pattern voltage may be changed according to system design requirements.

Meanwhile, after starting the motor, current distribution may occur. Accordingly, the controller may not perform the resistance estimation and the position estimation described herein in a section using current information.

Figure 13:
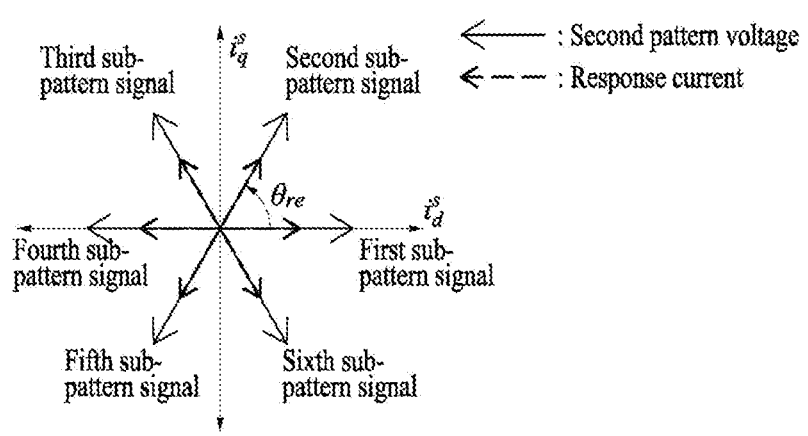
FIG. 13 is a diagram illustrating a method of estimating a position of a rotor according to an example embodiment.

FIG. 13 is a diagram illustrating a method of estimating a position of a rotor according to an example embodiment.

Referring to FIG. 13, a second pattern voltage including first to sixth sub-pattern voltages of different phases applied to the motor is illustrated. When the first to sixth sub-pattern voltages are applied, first to sixth response currents respectively corresponding thereto may be generated. At this time, when the first to sixth sub-pattern voltages are applied in a counterclockwise direction as shown in FIG. 13 to estimate the position of the rotor, the motor may be rotated due to torque. At this time, due to the rotation of the motor, unnatural tremors and movement problems may occur. Thus, the order of applying the second pattern voltage will be described in detail below with reference to the drawings.

Figure 14:
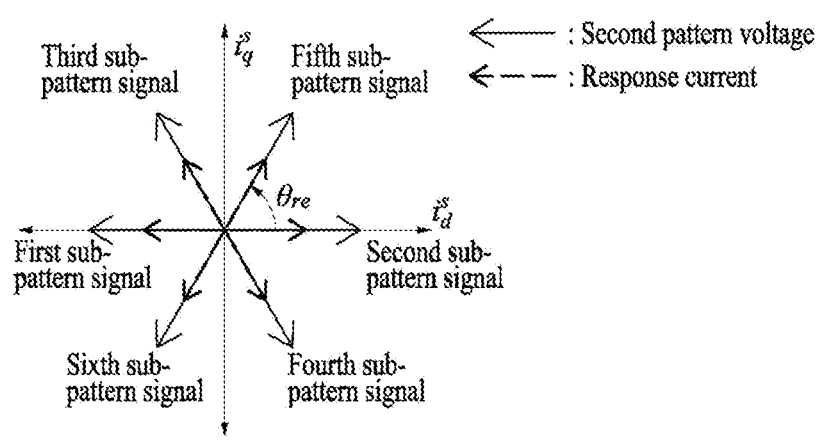
FIG. 14 is a diagram illustrating a method of estimating the position of the rotor according to another example embodiment.

FIG. 14 is a diagram illustrating a method of estimating the position of the rotor according to another example embodiment.

Referring to FIG. 14, in order to reduce the rotation of the motor according to the second pattern voltage, the order in which the first to sixth sub-pattern voltages are applied may be different from that of FIG. 13. At this time, two voltages having the same phase and different magnitudes may be applied to as the first pattern voltage, and thus, the first sub-pattern voltage of the second pattern voltage may have a phase that is different from that of the first pattern voltage by a first angle. That is, the first sub-pattern voltage having a phase that is different from that of the first pattern voltage by the first angle may be applied to the motor. For example, when two voltages having 0° and different magnitudes are applied to as the first pattern voltage, the first sub-pattern voltage of the second pattern voltage may be applied to at 180°. Here, the first angle may be a fixed value, or an angle close to the fixed value. For example, the first sub-pattern voltage of the second pattern voltage may be applied to at 180°+/−10°. In other words, in the first response current corresponding to the first sub-pattern voltage, an id component (X-axis component) may be greater than an $i_q$ component (Y-axis component).

In addition, the second sub-pattern voltage of the second pattern voltage may have a phase different from that of the first sub-pattern voltage by the first angle. For example, when the first sub-pattern voltage is applied at 180°, the second sub-pattern voltage may be applied at 0°. Similarly, a first angle may be a fixed value, or an angle close to the fixed value. For example, the second sub-pattern voltage of the second pattern voltage may be applied to at 0°+/−10°. That is, the first angle and the second angle may be angles determined to reduce the rotation of the motor, which occurs according to the second pattern voltage, and the second sub-pattern voltage may be applied to a position at which the rotation of the motor due to the first sub-pattern voltage and the second sub-pattern voltage is reduced. In other words, in the second response current corresponding to the second sub-pattern voltage, an id component (X-axis component) may be greater than an $i_q$ component (Y-axis component).

In addition, the third sub-pattern voltage of the second pattern voltage may have a phase different from that of the second sub-pattern voltage by the second angle. For example, when the second sub-pattern voltage is applied at 0°, the third sub-pattern voltage may be applied at 120°. Since the first to sixth sub-pattern voltages may be applied to different positions of the motor, the third sub-pattern voltage needs to be applied at a different position instead of the same position as the first sub-pattern voltage, and at this time, the third sub-pattern voltage may be applied at a position at which the rotation of the motor may be reduced as much as possible. In other words, in the third response current corresponding to the third sub-pattern voltage, an id component (X-axis component) may be less than an $i_q$ component (Y-axis component).

In addition, the fourth sub-pattern voltage of the second pattern voltage may have a phase different from that of the third sub-pattern voltage by the first angle. For example, when the third sub-pattern voltage is applied at 120°, the fourth sub-pattern voltage may be applied at 300°. Since the first to sixth sub-pattern voltages may be applied to different positions of the motor, the fourth sub-pattern voltage may be applied to a position at which the rotation of the motor may be reduced as much as possible. In other words, in the fourth response current corresponding to the fourth sub-pattern voltage, an id component (X-axis component) may be less than an $i_q$ component (Y-axis component).

In addition, the fifth sub-pattern voltage of the second pattern voltage may have a phase different from that of the fourth sub-pattern voltage by the second angle. For example, when the fourth sub-pattern voltage is applied at 300°, the fifth sub-pattern voltage may be applied at 60°. Since the first to sixth sub-pattern voltages may be applied to different positions of the motor, the fifth sub-pattern voltage may be applied to a position at which the rotation of the motor may be reduced as much as possible. In other words, in the fifth response current corresponding to the fifth sub-pattern voltage, an id component (X-axis component) may be less than an $i_q$ component (Y-axis component).

In addition, the sixth sub-pattern voltage of the second pattern voltage may have a phase different from that of the fifth sub-pattern voltage by the first angle. For example, when the fifth sub-pattern voltage is applied at 60°, the sixth sub-pattern voltage may be applied at 240°. Since the first to sixth sub-pattern voltages may be applied to different positions of the motor, the sixth sub-pattern voltage may be applied to a position at which the rotation of the motor may be reduced as much as possible. In other words, in the sixth response current corresponding to the sixth sub-pattern voltage, an id component (X-axis component) may be less than an $i_q$ component (Y-axis component).

The position of the rotor of the motor may be estimated based on the maximum point of the phases of the first to sixth response currents respectively corresponding to the first to sixth sub-pattern voltages. For example, the position of the rotor of the motor may be estimated on the basis of the fourth response current having the maximum phase among the first to sixth response currents.

Figure 15:
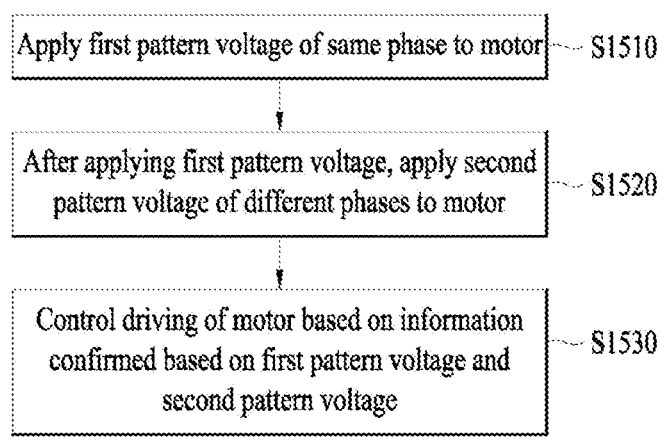
FIG. 15 is a flowchart for describing a motor control method according to an example embodiment.

FIG. 15 is a flowchart for describing a motor control method according to an example embodiment. For a detailed description of the overlapping content, reference is made to the above description.

Referring to FIG. 15, in operation S1510, a controller may apply a first pattern voltage of the same phase to the motor. The first pattern voltage may include signals of different magnitudes, and signals having the same phase and different magnitudes may be applied, and thus resistance of the stator of the motor may be estimated. At this time, the resistance of the stator may be estimated in a section in which response currents corresponding to the signals of different magnitudes are less than 0 A.

In operation S1520, after applying the first pattern voltage, the controller may apply a second pattern voltage of different phases to the motor. The second pattern voltage may include a plurality of signals of different phases, which are applied to the motor. At this time, the phases of the plurality of signals may be determined so that the rotation of the motor according to the application of the second pattern voltage may be reduced. In addition, since the signals having the same phase and different magnitudes are applied as the first pattern voltage, a first sub-pattern signal of the second pattern voltage may be applied to have a phase opposite to that of the first pattern voltage. For example, when, as the first pattern voltage, signals having different magnitudes are applied at 0°, the first sub-pattern signal of the second pattern voltage may be applied at 180°, a second sub-pattern signal thereof may be applied at 0°, a third sub-pattern signal thereof may be applied at 120°, a fourth sub-pattern signal thereof may be applied at 300°, a fifth sub-pattern signal thereof may be applied at 60°, and a sixth sub-pattern signal thereof may be applied at 240°.

In operation S1530, the controller may control the driving of the motor on the basis of information that is confirmed on the basis of the first pattern voltage and the second pattern voltage. Specifically, the controller may control the starting of the motor later on the basis of the resistance of the stator confirmed on the basis of the first pattern voltage and the second pattern voltage and the position of the rotor.

According to the example embodiments described above, the electronic apparatus or the terminal may include a processor, a memory for storing and executing program data, a permanent storage such as a disk drive, a communication port for communicating with external devices, and user interface devices, such as a touch panel, keys, buttons, and the like. Methods may be implemented with software modules or algorithms and may be stored as program instructions or computer-readable codes executable on a processor on a computer-readable recording medium. Examples of the computer-readable recording medium include magnetic storage media (for example, read-only memory (ROM), random-access memory (RAM), floppy disks, hard disks, and the like), optical recording media (for example, CD-ROMs, or digital versatile discs (DVDs)), and the like. The computer-readable recording medium may also be distributed over network coupled computer systems so that the computer-readable codes are stored and executed in a distributive manner. The media may be readable by the computer, stored in the memory, and executed by the processor.

The present example embodiments may be described in terms of functional block components and various processing operations. Such functional blocks may be implemented by any number of hardware and/or software components configured to perform the specified functions. For example, these example embodiments may employ various integrated circuit (IC) components, for example, memory elements, processing elements, logic elements, look-up tables, and the like, which may perform various functions under the control of one or more microprocessors or other control devices. Similarly, where components are implemented using software programming or software components, the present example embodiments may be implemented with any programming or scripting language including C, C++, Java, assembler, or the like, with the various algorithms being implemented with any combination of data structures, processes, routines or other programming components. Functional aspects may be implemented in algorithms that are executed on one or more processors. In addition, the present example embodiments may employ conventional techniques for electronics environment setting, signal processing, and/or data processing and the like. The terms "mechanism," "element," "means," "configuration," and the like may be used in a broad sense and are not limited to mechanical or physical components. The term may include the meaning of a series of routines of software in conjunction with a processor or the like.

An aspect provides a motor control apparatus and method for accurately estimating resistance of a stator and a position of a rotor before starting a motor.

An aspect also provides a motor control apparatus and method for accurately estimating resistance of a stator and a position of a rotor without including a sensor and more accurately controlling the operation of a clothes treating apparatus later.

An aspect also provides a technique for a motor control related to the order of applying a second pattern voltage to reduce the rotation of a motor occurring due to torque generated while estimating a position of a rotor.

An aspect also provides a technique for motor a control capable of reducing the rotation of a motor by applying a second pattern voltage in consideration of a phase of a first pattern voltage.

An aspect also provides a technique for reducing the rotation of a motor by offsetting torque by determining an application order of a second pattern voltage including a plurality of signals so that the rotation of the motor is reduced as much as possible.

An aspect also provides a motor control apparatus and method for controlling malfunctions of a clothes treating apparatus by improving performance of estimating an initial position when applying a sensorless algorithm.

The technical goal to be achieved by the present example embodiments is not limited to the above-described technical aspects, and other technical aspects which are not described may be inferred from the following example embodiments.

According to an aspect, there is a motor control apparatus for controlling a motor without position alignment, the motor control apparatus including an inverter part configured to convert a direct current (DC) input into an alternating current (AC) output and provide the AC output to the motor, and a controller configured to control the inverter part in relation to driving of the motor, and the controller controls the inverter part to apply a first pattern voltage having the same phase to the motor and then apply a second pattern voltage having different phases to the motor.

The second pattern voltage may include a plurality of sub-pattern signals having different phases, which are applied to the motor.

Specifically, the controller may control the inverter part to apply a first sub-pattern signal on the basis of a phase corresponding to a difference of a first angle from the first pattern voltage, and then apply a second sub-pattern signal on the basis of a phase corresponding to a difference of the first angle from the first sub-pattern signal, and then apply a third sub-pattern signal on the basis of a phase corresponding to a difference of a second angle from the second sub-pattern signal.

The controller may control the inverter part to apply a fourth sub-pattern signal on the basis of a phase corresponding to a difference of the first angle from the third sub-pattern signal, and then apply a fifth sub-pattern signal on the basis of a phase corresponding to a difference of the second angle from the fourth sub-pattern signal, and then apply a sixth sub-pattern signal on the basis of a phase corresponding to a difference of the first angle from the fifth sub-pattern signal.

Desirably, the first angle and the second angle may be determined to reduce rotation of the motor that occurs according to the second pattern voltage.

The controller may estimate a position of a rotor of the motor on the basis of a maximum point of phases of response currents corresponding to the second pattern voltage.

The controller may control the inverter part to apply the second pattern voltage having a phase opposite to that of the first pattern voltage.

The first pattern voltage may include a plurality of signals having the same phase and different magnitudes, and the controller may estimate resistance of a stator of the motor by applying the plurality of signals having the same phase and different magnitudes.

The controller may estimate the resistance of the stator in a section in which response currents corresponding to the signals having different magnitudes are less than zero.

The first pattern voltage and the second pattern voltage may be sine waves.

According to another aspect, there is also provided a motor control method for controlling a motor without position alignment, the motor control method including applying a first pattern voltage having the same phase to a motor, applying the first pattern voltage and then applying a second pattern voltage having different phases to the motor, and controlling driving of the motor according to information confirmed on the basis of the first pattern voltage and the second pattern voltage.

Specific details of other example embodiments are included in the detailed descriptions and drawings.

In a motor control apparatus and method according to an example embodiment disclosed herein, one or more of the following effects can be expected.

The motor control apparatus according to an example embodiment of the present specification can control malfunctions of a clothes treating apparatus by accurately estimating resistance of a stator and a position of a rotor in a sensorless method by being included in a clothes control apparatus.

At this time, a first pattern voltage is first applied to estimate the resistance of the stator having a relatively larger influence, and then a second pattern voltage having a different phase is applied to estimate the position of the rotor, so that accuracy can be improved.

Specifically, in a first response current and a second response current corresponding to a second pattern voltage, an id component has a larger value than an $i_q$ component so that the rotation of a motor can be reduced as much as possible.

More specifically, in order to offset the occurrence of torque as much as possible, the second pattern voltage is applied at different phases of the motor on the basis of a first angle and a second angle so that the accuracy can be improved.

At this time, the position of the rotor is estimated based on the maximum point of phases of response currents corresponding to the second pattern voltage so that a value very close to an actual position of the rotor can be acquired.

In addition, the resistance of the stator can be estimated in a section in which response currents corresponding to signals having different magnitudes are less than zero, so that a highly accurate resistance value of the stator can be acquired.

In addition, the rotor position estimation can be performed in a relatively short time, so that an operation at the time of initial start-up can be quickly performed.

Accordingly, the operation of the motor can be accurately and stably controlled so that a clothes treating apparatus can stably operate.

Effects of the present disclosure will not be limited to the above-mentioned effects and other unmentioned effects will be clearly understood by those skilled in the art from the following claims.

The above-described example embodiments are merely examples and other example embodiments may be implemented within the scope of the following claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor control apparatus comprising:
an inverter configured to convert a direct current (DC) input into an alternating current (AC) output, and to provide the AC output to a motor; and
a controller configured to control the inverter in relation to driving the motor,
wherein the controller is configured to control the inverter to apply a first pattern voltage having a same phase to the motor and to apply a second pattern voltage having different phases to the motor.

2. The motor control apparatus of claim 1, wherein
the second pattern voltage includes a plurality of sub-pattern signals having different phases, and
the controller is configured to control the inverter to:
apply a first sub-pattern signal having a phase different from a phase of the first pattern voltage by a first angle,
apply a second sub-pattern signal having a phase different from the phase of the first sub-pattern signal by the first angle, and
apply a third sub-pattern signal having a phase different from the phase of the second sub-pattern signal by a second angle.

3. The motor control apparatus of claim 2, wherein the controller is configured to control the inverter to:
apply a fourth sub-pattern signal having a phase different from the phase of the third sub-pattern signal by the first angle,
apply a fifth sub-pattern signal having a phase different from the phase of the fourth sub-pattern signal by the second angle, and
apply a sixth sub-pattern signal having a phase different from the phase of the fifth sub-pattern signal by the first angle.

4. The motor control apparatus of claim 2, wherein the first angle and the second angle are determined to reduce rotation of the motor that occurs according to the second pattern voltage.

5. The motor control apparatus of claim 1, wherein the controller is configured to estimate a position of a rotor of the motor based on a maximum point of phases of response currents corresponding to the second pattern voltage.

6. The motor control apparatus of claim 1, wherein the controller is configured to control the inverter to provide a sub-pattern signal of the second pattern voltage, which has a phase opposite to a phase of the first pattern voltage.

7. The motor control apparatus of claim 1, wherein
the first pattern voltage includes a plurality of signals having a same phase and different magnitudes, and
the controller is configured to estimate resistance of a stator of the motor by applying, to the motor, the plurality of signals having the same phase and different magnitudes.

8. The motor control apparatus of claim 7, wherein the controller is configured to estimate the resistance of the stator based on a section of a response current, corresponding to one of the plurality of signals having different magnitudes, being less than zero.

9. The motor control apparatus of claim 1, wherein the controller is configured to apply the first pattern voltage in a sine wave form, and the controller is configured to apply the second pattern voltage in a sine wave form.

10. A laundry treating apparatus comprising:
a cabinet;
a tub disposed in the cabinet;
a drum disposed in the tub;
the motor to drive the drum; and
the motor control apparatus of claim 1.

11. A motor control apparatus to control a motor, comprising:
a driver configured to receive a direct current (DC) power and to provide an alternate current (AC) power to the motor; and
a controller configured to:
control the driver to apply, to the motor, a plurality of first signals having a same phase,
control the driver to apply, to the motor, a plurality of second signals having different phases,
determine resistance information and position information of the motor based on the applied plurality of first signals and the applied plurality of second signals, and
control the driver to apply, to the motor, driving power to drive the motor based on the determined resistance information and the determined position information.

* * * * *